United States Patent
Phelps et al.

(10) Patent No.: US 6,264,726 B1
(45) Date of Patent: Jul. 24, 2001

(54) METHOD OF FILTERING A TARGET COMPOUND FROM A FIRST SOLVENT THAT IS ABOVE ITS CRITICAL DENSITY

(75) Inventors: Max R. Phelps, Richland; Clement R. Yonker, Kennewick; John L. Fulton; Lawrence E. Bowman, both of Richland, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/410,165

(22) Filed: Sep. 30, 1999

(51) Int. Cl.⁷ .................................................. B01D 53/22
(52) U.S. Cl. ........................................ 95/45; 95/50
(58) Field of Search ........................................ 95/45–55

(56) References Cited

U.S. PATENT DOCUMENTS

| | | | |
|---|---|---|---|
| 4,929,357 | * 5/1990 | Schucker | 95/50 X |
| 5,158,704 | * 10/1992 | Fulton et al. | 252/309 |
| 5,430,224 | 7/1995 | Schucker | 585/818 |
| 5,670,051 | * 9/1997 | Pinnau et al. | 95/50 X |
| 5,843,208 | * 12/1998 | Anumakonda et al. | 95/45 X |
| 6,039,792 | * 3/2000 | Calamur et al. | 95/45 |
| 6,039,878 | * 3/2000 | Sikdar et al. | 95/45 X |
| 6,086,768 | * 7/2000 | Sims | 95/46 X |

FOREIGN PATENT DOCUMENTS

96/18445   6/1996   (FR) .

OTHER PUBLICATIONS

SJ Sarrade et al., "Supercritical $CO_2$ Extraction Coupled With Nanofiltration Separation Applications To Natural Products", pp. 19–25, 1998.

* cited by examiner

*Primary Examiner*—Robert H. Spitzer
(74) *Attorney, Agent, or Firm*—Paul W. Zimmerman

(57) ABSTRACT

The present invention is a method of separating a first compound having a macromolecular structure from a mixture. The first solvent is a fluid that is a gas at standard temperature and pressure and is at a density greater than a critical density of the fluid. A macromolecular structure containing a first compound is dissolved therein as a mixture. The mixture is contacted onto a selective barrier and the first solvent passed through the selective barrier thereby retaining the first compound, followed by recovering the first compound. By using a fluid that is a gas at standard temperature and pressure at a density greater than its critical density, separation without depressurization is fast and efficient.

31 Claims, 3 Drawing Sheets

METHOD OF FILTERING A TARGET COMPOUND FROM A FIRST SOLVENT THAT IS ABOVE ITS CRITICAL DENSITY

This invention was made with Government support under Contract DE-AC0676RLO1830 awarded by the U.S. Department of Energy. The Government has certain rights in the invention.

FIELD OF THE INVENTION

The present invention is a method of separating a target compound from a first solvent that is above its critical density. More specifically, the present invention is a selective barrier separation of the target compound from the first solvent while the first solvent is above its critical density. The present invention specifically excludes perstraction; perstraction is a separation method based method upon permeation of a target compound through a selective barrier rather than blocking or retention of a target compound upon the selective barrier.

As used herein, the term selective barrier and/or grammatical variants thereof includes membrane and/or filter suitable for separations by microfiltration (blocked particle size range from about 2 μm to about 0.03 μm), ultrafiltration (blocked particle size range from about 0.11 μm to about 0.002 μm), nanofiltration (blocked particle size range from about 0.006 μm to about 0.0009 μm) and/or reverse osmosis (hyperfiltration) (blocked particle size range from about 0.0011 μm to about 0.0001 μm).

As used herein, the word membrane refers to a structure that may be thick or thin, homogeneous or heterogeneous, passive or active, biological or synthetic, symmetric or asymmetric, porous or non-porous. Passive refers to transport through the membrane based upon an energy potential for example pressure, concentration, temperature and combinations thereof.

BACKGROUND OF THE INVENTION

Separations of target compounds of microspecies (MW<1000 amu), macromolecules (MW>1000 amu) and/or macromolecular structures (including but not limited to micelles, reverse micelles, metal complexes) is generally accomplished with reverse osmosis, microfiltration, ultrafiltration, nanofiltration and combinations thereof. These methods suffer from high pressure drop and low flow rate.

Use of supercritical fluids as a solvent generally involves a depressurization so that the solvent quickly evaporates leaving behind the target compound. This method suffers from the inefficiency introduced by the depressurization.

U.S. Pat. No. 5,430,224 to Schucker discusses a supercritical perstraction process. Supercritical carbon dioxide is reported to increase toluene permeation through a polyesterimide membrane compared to n-heptane.

The paper Supercritical $CO_2$ Extraction Coupled With Nanofiltration Separation Applications to Natural Products, S J Sarrade, G M Rios, M Carles, Separation and Purification Technology 14 (1998) 19–25, states that the idea of coupling a supercritical $CO_2$ extration stage with nanofiltration separation to extract and purify low molecular weight compounds up to 1500 g/mol had been proposed as early as 1994. In this paper, Sarrade et al. discuss fractionation of fish oil to obtain essential fatty acids useful in treating heart disease, and purification of β-carotine from either carrot oil or carrot seeds.

The International Publication WO 96/18445, Jun. 20, 1996 by Sarrade et al. contains discussion of additional separations using supercritical fluids, for example triglycerides from butter, but again is limited to target compounds with molecular weights ranging from 50 to 1,000 Daltons.

Hence, there is a need for a method of separating a target compound having a macromolecular structure from a solvent with greater efficiency.

SUMMARY OF THE INVENTION

The present invention is a method of separating a first compound having a macromolecular structure from a mixture. The mixture is the first compound dissolved in a first solvent. The first solvent is a fluid that is a gas at standard temperature and pressure and is at a density greater than a critical density of the fluid. The mixture is contacted onto a membrane and the first solvent passed through the membrane, retaining the first compound, followed by recovering the first compound.

It is an object of the present invention to provide a method for filtering a target compound from a first solvent at greater efficiency.

By using a fluid that is a gas at standard temperature and pressure at a density greater than its critical density, membrane separation without depressurization is fast and efficient.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
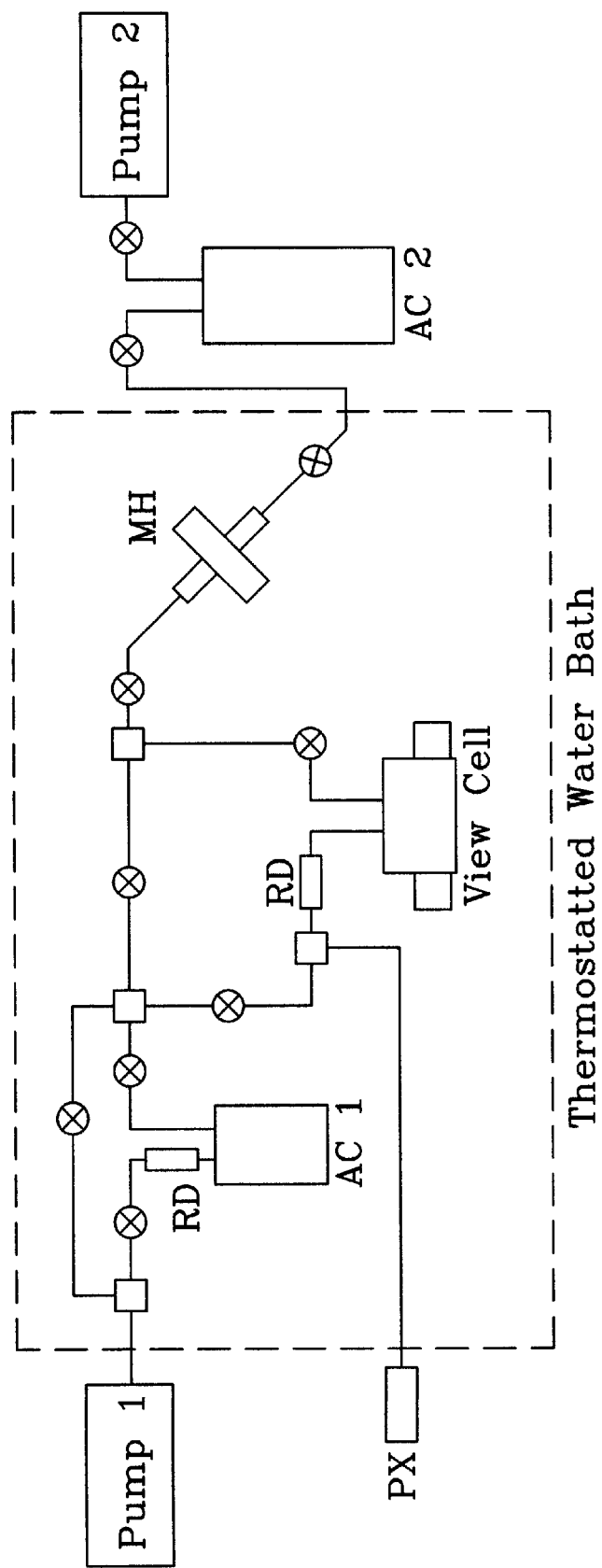
FIG. 1 is a schematic diagram of the experimental apparatus. Pumps 1 and 2 are syringe pumps, RD—rupture disks, PX—pressure transducer, MH—membrane holder; AC1 and AC2—autoclaves 1 and 2.

The present invention is a method of separating a first compound having a macromolecular structure from a mixture. The method has the steps of:

(a) dissolving the first compound in a first solvent as the mixture wherein the first solvent is a fluid that is a gas at standard temperature and pressure and is at a density greater than a critical density of the fluid;

(b) contacting the mixture onto a selective barrier and passing the first solvent through the selective barrier, and retaining the first compound; and (c) recovering the first compound.

As used herein, the term "macromolecular structure" includes but is not limited to a micelle, reverse micelle and combinations thereof wherein the first compound is in a discontinuous phase of the first solvent that is carried in a second solvent continuous phase as the mixture, wherein the first solvent is substantially insoluble in the second solvent. Substantially insoluble is defined as a solubility less than about 10%, preferably less than about 5% and most preferably less than about 1%. A polar fluid is substantially insoluble in the second solvent. The first solvent includes but is not limited to polar fluid for example water, surfactant for example anionic, cationic, non-ionic and zwitterionic surfactants, cosolvent, emulsifier, and combinations thereof. Surfactants specifically include bis-2-ethylhexyl sulfosuccinate sodium salt, didodecyldimethyl ammonium bromide, 1-alpha-phosphatidylcholine.

A preferred polar fluid is water. Polar is herein defined as having a dielectric constant greater than about 1.2. Hence, the first or target compound may be dissolved in the first or second solvent as defined herein.

The target compound includes but is not limited to microspecies including but are not limited to atomic species (ionic and non-ionic), molecular species (ionic and non-ionic), and combinations thereof; macromolecules including but are not limited to polymer, protein, metal complex (metal chelate), macromolecules having molecular weight greater than 10,000 amu and combinations thereof.

"Macromolecular structure" also includes a macromolecule having a molecular weight greater than 10,000 amu and a radius of gyration. In this instance, the macromolecule is dissolved in the first solvent.

The properties of the fluid that is a gas at standard temperature and pressure and at a density greater than a critical density of the fluid were set forth in U.S. Pat. No. 5,158,704 hereby incorporated by reference. The second solvent includes but is not limted to hydrocarbons, for example ethylene, propane, ethane; non-hydrocarbons, for example, fluorocarbons (e.g. freon), carbon dioxide, and combinations thereof.

The mixture may include a first compound together with at least one second compound any of which may be the target compound(s), and any of which may be retained or passed by the membrane for purposes of isolating by separation, the target compound(s). The second compound may be organic or inorganic. More specifically, the second compound may be water, surfactant and combinations thereof. Surfactant may be ionic or non-ionic. A preferred surfactant is AOT.

The selective barrier may be any selective barrier that is chemically compatible with the solvent(s) and dissolved target compound. More specifically, the selective barrier may be permeable, semi-permeable, or non-permeable, and be either hydrophobic, hydrophilic, or some degree between, and be either symmetric or asymmetric. A preferred membrane is asymmetric, semipermeable, and somewhat hydrophilic; for example: a spiral wound, asymmetric cellulose acetate in the ultrafiltration range. The membrane may be deployed in any geometry. Two common geometries are planar and cylindrical.

When a planar geometry is used, the second solvent passes through the membrane leaving behind or retaining the dissolved first or second compound on the retentate side of the membrane. A cross flow along the retentate side of the membrane facilitates recovering the retained first or second compound.

The method of the present invention may be useful for purification of macromolecules or macromolecular structures, extraction from complex matrices, for example fermentation broth, chemical product or waste streams, process extraction streams and combinations thereof.

In a preferred embodiment, the method has the steps of:
(a) providing a first solvent as a reverse micelle discontinuous phase that is carried in a second solvent continuous phase, the second solvent is a fluid that is a gas at standard temperature and pressure and is at a density greater than a critical density of said fluid, the first solvent is substantially insoluble in said second solvent;
(b) dissolving the first compound into either of the first or second solvent as a mixture;
(c) contacting the mixture onto a selective barrier and passing the second solvent through the selective barrier, and retaining the first compound; and
(d) recovering the first compound.

Equipment and Procedure for Examples

Experiments were conducted to demonstrate the present invention where membranes are used to selectively retain or pass species dissolved in a liquefied gas or supercritical fluid microemulsion, specifically separating simple mixtures dissolved in a microemulsion in a liquefied gas (propane) and in a supercritical fluid (ethane). The separations include cytochrome c (a protein) from a surfactant, and two dextrans of differing molecular weight. Neither the protein nor the dextrans are directly soluble in the fluids. However they are soluble in a microemulsion (surfactant) in the fluids.

The compressed gases propane and ethane were commercial purity and were obtained from Matheson and Scott Specialty Gases, respectively. The surfactant AOT (Dioctyl sulfosuccinate, sodium salt) was from Aldrich. The protein cytochrome c was purchased from Sigma. Dextrans having narrow nominal molecular weights were purchased from Molecular Probes Inc. (Eugene, Oreg.). Each molecular weight dextran was purchased with a chromophore label specific to the dextran molecular weight. This allowed permeate and retentate to be characterized via UV/VIS spectrometry.

A high pressure system was assembled from various commercially available and in-house fabricated components. These include syringe pumps (Isco), high pressure fittings and adapters (High Pressure Equipment), a high pressure membrane holder (Millipore), a view cell (in-house), and two small autoclaves (in-house). The membranes (Millipore) were an ultrafiltration type that allowed dissolved species having a molecular weight below a given cutoff to pass through. A sketch showing an example of the experimental apparatus is given in FIG. 1.

Solutions of the microemulsions in the fluids were prepared in the view cell—a high pressure vessel with through optical access which allows visual verification of complete solution of all components. An optional component is Autoclave 1 which is also filled with the same surfactant solution as the view cell (less the dextrans or protein) and provides a feed stream of microemulsion into the view cell. Autoclave 2 is a collection vessel for the permeate fluid. UV/VIS absorption spectra were acquired with a Varian/Cary 2200 UV/VIS Spectrometer.

Measured amounts of dextrans or protein, AOT, and water were added to the view cell. The view cell was then sealed, connected to the pressure system and pressurized with either ethane or propane. It was stirred with a magnetic stirring bar. The view cell was heated when the separation was to be carried out in the supercritical regime. Once the contents of view cell were observed to be in solution, valves were adjusted to isolate the view cell while the rest of the apparatus was pressurized. For the separation of dextrans in supercritical ethane, AC1 was prepared with the same composition of AOT and water as in the view cell. For separations in the supercritical regime, the view cell and the other indicated portions of the apparatus were immersed in a thermostatted water bath. Flow through the system was initiated by adjusting the valves appropriately and setting both pumps to maintain a constant differential pressure. That is Pump 1 delivered fluid into the apparatus while pump 2 filled with fluid from Autoclave 2 via displacement. Once enough fluid had flowed through the apparatus, the experiment was stopped and the apparatus was depressurized. Permeate and retentate were collected and dissolved in hexane. UV/VIS absorption spectra were acquired of these solutions.

EXAMPLE 1

Figure 2:
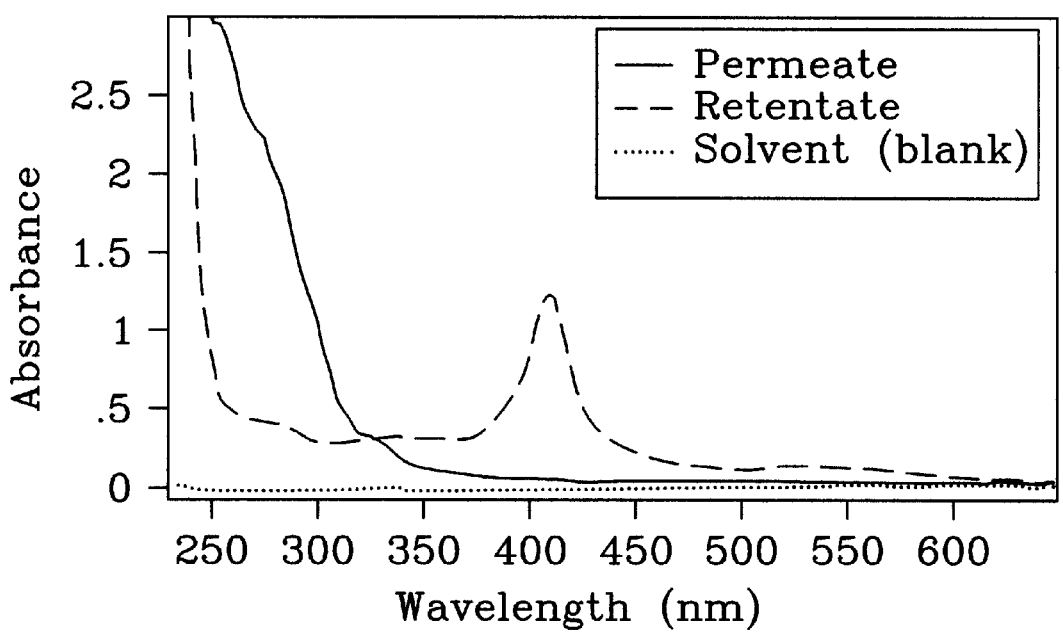
FIG. 2 is a graph illustrating the results of Example 1.

Cytochrome c separated from the surfactant AOT in liquid propane at 20° C. and 2,000 psi using a 10,000 nominal molecular weight membrane. The majority of the protein (MW about 13,000, $\lambda_{max}$ 414 nm) is retained as evidenced by the peak in the spectrum (FIG. 2) of the retentate and lack of a spectral activity is this region of the permeate spectrum.

EXAMPLE 2

Figure 3:
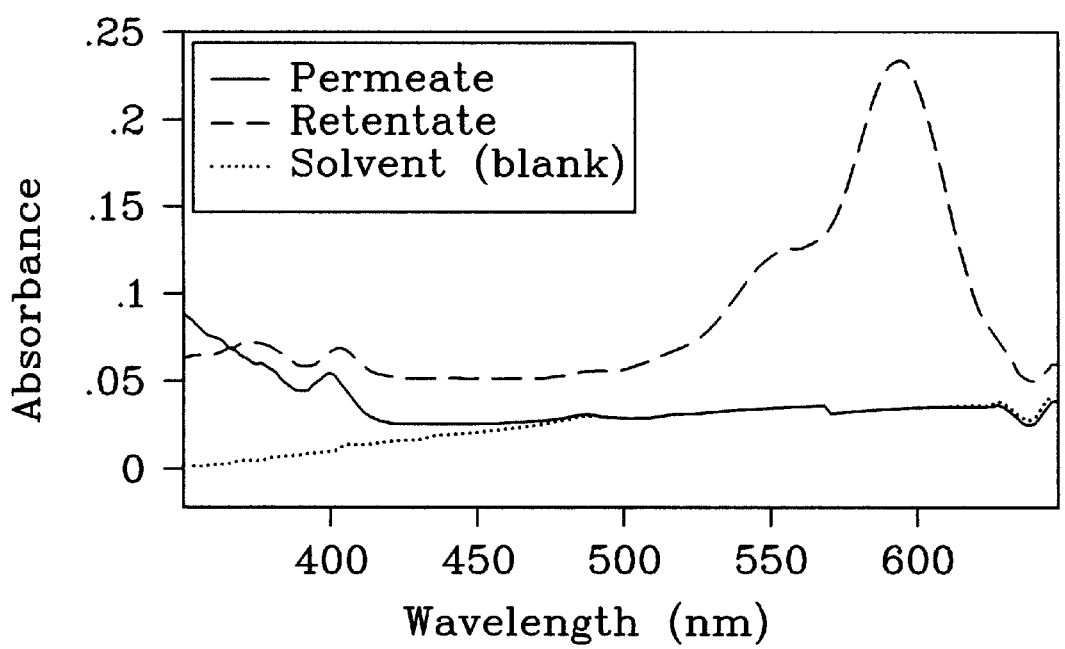
FIG. 3 is a graph illustrating the results of Example 2.

Two labeled dextrans from an AOT microemulsion in liquid propane at 22° C., 2,000 psi using a 5,000 nominal molecular weight membrane were separated. The spectra (FIG. 3) indicate that virtually all of a 40,000 nominal molecular weight dextran labeled with a chromophore having a $\lambda_{max}$ of about 590 nm is retained while most of a 3,000 nominal molecular weight dextran labeled with a chromophore having a $\lambda_{max}$ of about 400 nm passed through the membrane.

EXAMPLE 3

Figure 4:
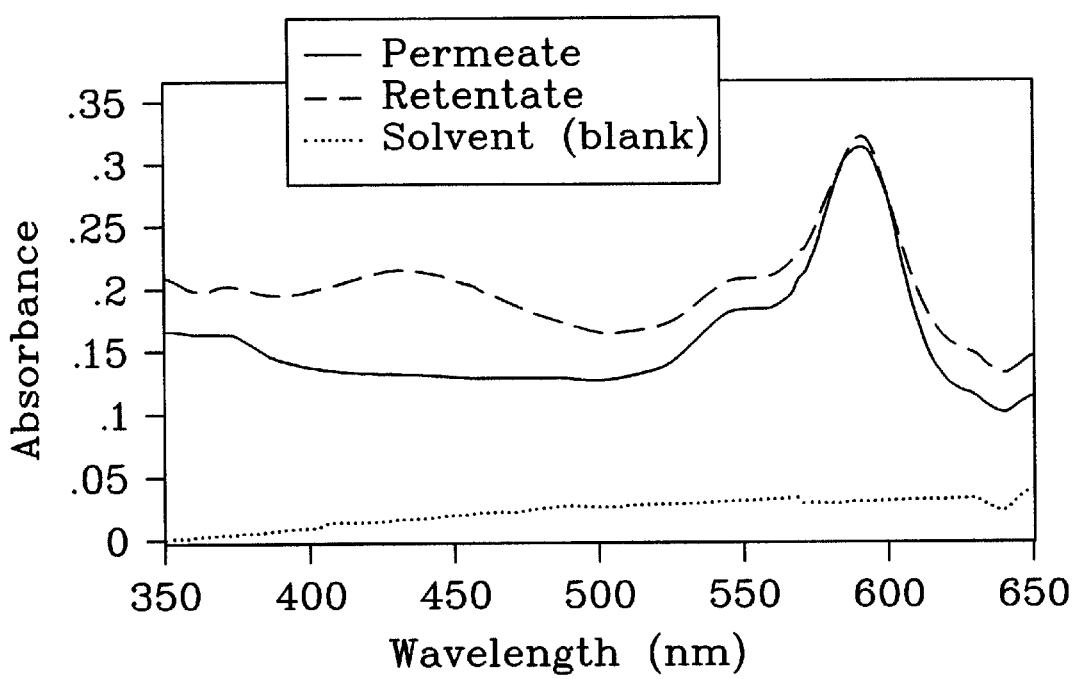
FIG. 4 is a graph illustrating the results of Example 3.

Two labeled dextrans from an AOT microemulsion in supercritical ethane at 40° C., 7,250 psi using a 10,000 nominal molecular weight membrane were separated. The spectra (FIG. 4) indicate that a 3,000 nominal molecular weight dextran labeled with a chromophore having a $\lambda_{max}$ of about 590 nm preferentially passed through the membrane while virtually all of a 40,000 nominal molecular weight dextran labeled with a chromophore having a $\lambda_{max}$ of about 440 nm was retained.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of separating a first compound having a macromolecular structure from a mixture, comprising the steps of:
    (a) dissolving said first compound in a first solvent as said mixture, said first solvent is a fluid that is a gas at standard temperature and pressure and is at a density greater than a critical density of said fluid;
    (b) contacting said mixture onto a selective barrier and passing said first solvent through said selective barrier, and retaining said first compound; and
    (c) recovering said first compound.

2. The method as recited in claim 1, wherein said macromolecular structure is a reverse micelle.

3. The method as recited in claim 1, wherein said macromolecular structure is a macromolecule having a molecular weight greater than 10,000 amu and a radius of gyration.

4. A method of filtering a first compound, comprising the steps of:
    (a) providing a first solvent as a discontinuous phase in a reverse micelle that is carried in a second solvent continuous phase, said second solvent is a fluid that is a gas at standard temperature and pressure and is at a density greater than a critical density of said fluid, said first solvent is substantially insoluble in said second solvent;
    (b) dissolving said first compound into either of said first or second solvent as a mixture;
    (c) contacting said mixture onto a selective barrier and passing said second solvent through said selective barrier, and retaining said first compound; and
    (d) recovering said first compound.

5. The method as recited in claim 4, wherein said passing includes passing said first solvent through said selective barrier.

6. The method as recited in claim 4, wherein said selective barrier comprises a membrane that is planar.

7. The method as recited in claim 4, wherein said selective barrier comprises a membrane that is cylindrical.

8. The method as recited in claim 4, wherein said second solvent is a hydrocarbon.

9. The method as recited in claim 8, wherein said hydrocarbon is selected from the group consisting of ethylene, propane, ethane and combinations thereof.

10. The method as recited in claim 4, wherein said second solvent is selected from the group consisting of fluorocarbon, carbon dioxide, sulfur hexafluoride and combinations thereof.

11. The method as recited in claim 10, wherein said fluorocarbon is chlorodifluoromethane.

12. The method as recited in claim 4, wherein said first solvent has a solubility with respect to said second solvent, said solubility less than about 10%.

13. The method as recited in claim 12, wherein said first solvent is selected from the group consisting of polar fluid, surfactant and combinations thereof.

14. The method as recited in claim 13, wherein said polar fluid is water.

15. The method as recited in claim 13, wherein said first solvent is a surfactant.

16. The method as recited in claim 15 wherein said surfactant is selected from the group consisting of anionic, cationic, non-ionic, zwitterionic surfactants and combinations thereof.

17. The method as recited in claim 15 wherein said surfactant is selected from the group consisting of bis-2-ethylhexyl sulfosuccinate sodium salt, didodecyldimethyl ammonium bromide, I-alpha-phosphatidylcholine and combinations thereof.

18. The method as recited in claim 4, wherein at least one second compound is present within said mixture.

19. The method as recited in claim 18, wherein said first compound is retained by said selective barrier and said second compound is passed through said selective barrier.

20. The method as recited in claim 19, wherein said first compound is a first target compound.

21. The method as recited in claim 20, wherein said second compound is a second target compound.

22. The method as recited in claim 19, wherein said second compound is a target compound.

23. The method as recited in claim 19, wherein said second compound is selected from the group consisting of protein, polymer, enzyme, biomacromolecule, salt, and combinations thereof.

24. A method of separating a macromolecule having a molecular weight greater than 10,000 amu and a radius of gyration from a mixture, comprising the steps of:

(a) dissolving said macromolecule in a first solvent having an atomic radius as said mixture, said first solvent is a fluid that is a gas at standard temperature and pressure and is at a density greater than a critical density of said fluid;

(b) contacting said mixture onto a selective barrier having a plurality of pores of an average pore diameter, and passing said first solvent through said plurality of pores, and retaining said macromolecule; and (c) recovering said macromolecule.

25. The method as recited in claim 24, wherein said macromolecule is selected from the group consisting of polymer, protein and combinations thereof.

26. The method as recited in claim 24, wherein at least one second compound is present with said first compound.

27. The method as recited in claim 26, wherein said first compound is retained by said selective barrier and said second compound is passed through said selective barrier.

28. The method as recited in claim 27, wherein said first compound is a first target compound.

29. The method as recited in claim 28, wherein said second compound is a second target compound.

30. The method as recited in claim 28, wherein said second compound is a target compound.

31. The method as recited in claim 24, wherein said radius of gyration is greater than said average pore diameter by at least 1%, and said atomic radius is less than said average pore diameter by at least two orders of magnitude.

* * * * *